US012687804B2

(12) United States Patent
Matayoshi et al.

(10) Patent No.: US 12,687,804 B2
(45) Date of Patent: Jul. 21, 2026

(54) IMAGE FORMING APPARATUS

(71) Applicant: CANON KABUSHIKI KAISHA, Tokyo (JP)

(72) Inventors: Yasumasa Matayoshi, Shizuoka (JP); Masatoshi Itoh, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 18/959,486

(22) Filed: Nov. 25, 2024

(65) Prior Publication Data

US 2025/0172893 A1 May 29, 2025

(30) Foreign Application Priority Data

Nov. 29, 2023 (JP) ................................ 2023-202275

(51) Int. Cl.
*G03G 15/20* (2006.01)
*G03G 15/00* (2006.01)

(52) U.S. Cl.
CPC ..... *G03G 15/2039* (2013.01); *G03G 15/2053* (2013.01); *G03G 15/2064* (2013.01); *G03G 15/80* (2013.01)

(58) Field of Classification Search
CPC ............... G03G 15/80; G03G 15/2017; G03G 15/2039; G03G 15/205; G03G 15/2053
See application file for complete search history.

(56) References Cited

U.S. PATENT DOCUMENTS

| | | | | |
|---|---|---|---|---|
| 5,412,453 | A * | 5/1995 | Matsuo | G03G 15/205 399/33 |
| 2014/0093268 | A1 | 4/2014 | Iwasaki et al. | G03G 15/20 |
| 2015/0093134 | A1 | 4/2015 | Itoh | G03G 15/00 |
| 2016/0216666 | A1 | 7/2016 | Iwasaki et al. | G03G 15/20 |
| 2018/0203392 | A1 | 7/2018 | Yamamoto et al. | G03G 15/20 |
| 2021/0063923 | A1 * | 3/2021 | Odate | G03G 15/5004 |
| 2021/0223727 | A1 * | 7/2021 | Suzuki | G03G 15/2039 |
| 2022/0004126 | A1 | 1/2022 | Yamamoto et al. | G03G 15/20 |

(Continued)

FOREIGN PATENT DOCUMENTS

| | | |
|---|---|---|
| JP | 2002-044959 | 2/2002 |
| JP | 2016-136175 | 7/2016 |
| JP | 2017-125964 | 7/2017 |

(Continued)

*Primary Examiner* — Thomas S Giampaolo, II
(74) *Attorney, Agent, or Firm* — Venable LLP

(57) ABSTRACT

An image forming apparatus includes a fixing unit including a heater and a temperature detecting element, a switching element, an interrupting element put in a connection state between the heater and an AC power source or an interruption state between the heater and the AC power source, and a controller for controlling the switching element and the interrupting element on the basis of temperature information detected by the temperature detecting element. In a case where the heater is raised in temperature when the interrupting element is in the connection state and a heater driving signal to the switching element is turned off, the controller switches the interrupting element from the connection state to the interruption state while keeping the heater driving signal off and switches the interrupting element from the interruption state to the connection state after a lapse of a predetermined time while keeping the heater driving signal off.

10 Claims, 12 Drawing Sheets

(56) References Cited

U.S. PATENT DOCUMENTS

| | | | | |
|---|---|---|---|---|
| 2022/0043387 | A1 | 2/2022 | Matayoshi et al. .... | G03G 15/00 |
| 2023/0213881 | A1 | 7/2023 | Kojima .................. | G03G 15/00 |

FOREIGN PATENT DOCUMENTS

| | | | | |
|---|---|---|---|---|
| JP | 2018-072432 | | | 5/2018 |
| JP | 2021067847 | A | * | 4/2021 |
| JP | 2023-100425 | | | 7/2023 |

* cited by examiner

IMAGE FORMING APPARATUS

FIELD OF THE INVENTION AND RELATED ART

The present invention relates to an image forming apparatus, and for example, relates to the image forming apparatus including an image heating device (apparatus) as an image fixing means.

As an AC waveform supplied to the image forming apparatus or the like, a sine wave with a rated power source voltage and frequency defined in standards in each of country is supplied. On the other hand, in an uninterruptible power source used as an auxiliary power source when an AC power source is cut off (interrupted), for example, as disclosed in Japanese Laid-Open Patent Application (JP-A) 2002-044959, a square wave synchronized in phase with the AC power source is used. In the case where power failure occurs in a facility in which the uninterruptible power source is installed, the AC waveform supplied to the image forming apparatus is switched from the sine wave to the square wave.

In the image forming apparatus operated by supplying the AC waveform thereto, a heating member driving circuit for heat-fixing a toner image transferred on recording paper has the following constitution in general.

A driving circuit for carrying out control of a heating member drives a phototriac coupler by a CPU on the basis of an output signal of a temperature detecting element. Then, a triac is put in a conduction state, so that electric power is supplied to the heating member and thus the heating member is heated. At this time, a driving signal is outputted from the CPU, and a relay connected in series to the heating member and the triac, and therefore, the electric power is supplied to the heating member. If the relay is not driven, a circuit is interrupted by a relay contact even when the triac is driven, and therefore the electric power is not supplied to the heating member. In such an image forming apparatus, as a constitution for detecting abnormal high-temperature (thermal runaway) of the heating member due to abnormality of the heating member driving circuit or the like, there is a constitution in which drive of the triac and the relay is stopped in the case where a temperature of the heating member reaches a predetermined temperature (abnormal high-temperature detection temperature). By this constitution, (electric) power supply to the heating member is interrupted. Further, as another method of detecting the abnormal high-temperature of the heating member, for example, there is a method which is shown in JP-A 2018-072342 and in which the power supply to a heater is interrupted by a temperature rise gradient per unit time detected by a temperature detecting element, or the like method.

When the AC waveform generated by the uninterruptible power source is supplied to the image forming apparatus, the supplied AC waveform is the square wave. Accordingly, a current applied to the triac and an inclination of the voltage waveform become abrupt, and therefore, due to a structure of the triac, there is a case where after the triac is turned on once, the triac goes into a commutation failure state such that the current for the power supply cannot be turned off at a zero-cross point.

When the triac goes into this commutation failure state, temperature control of the heating member by the triac becomes uncontrollable, and the electric power of the uninterruptible power source connected to the image forming apparatus is directly supplied to the heating member, so that the temperature of the heating member becomes an abnormally high temperature. Further, also in the case where the heating member driving circuit including the triac causes short-circuit failure, similarly, the temperature control of the heating member by the triac becomes uncontrollable, and the electric power of the uninterruptible power source connected to the image forming apparatus is directly supplied to the heating member, so that the temperature of the heating member becomes an abnormally high temperature. That is, a cause of the abnormal high-temperature includes the case due to the abnormality of the voltage waveform and the case due to failure of the heating member driving circuit including the triac. As a method for detecting the abnormal high-temperature of the heating member, there is a method in which the power supply to the heating member is interrupted by stopping the drive of the triac and the relay in the case where a detection temperature of the temperature detecting element reaches an abnormal high-temperature detection temperature or in the case where the temperature rise gradient per unit time becomes a certain value or more. In the case where the short-circuit failure of the heating member driving circuit including the triac, or the like is the cause, there is a need to exchange a substrate on which the heating member driving circuit is provided. In the case where the triac is put in the commutation failure state by inputting the square wave generated by the uninterruptible power source, the operation of the heating member can be restored to a normal operation when the waveform of the inputted AC voltage is returned to the sine wave. However, distinction of these cases cannot be made, so that there is a possibility that unnecessary substrate exchange by a service person or the like occurs. For this reason, an image forming apparatus capable of discriminating a cause of the abnormal high-temperature after the abnormal high-temperature occurs has been desired.

SUMMARY OF THE INVENTION

The present invention has been accomplished in the above-described circumstances, and a principal object of the present invention is to discriminate a cause of abnormal high-temperature of a heating member when a temperature of the heating member becomes an abnormally high temperature.

According to an aspect of the present invention, there is provided an image forming apparatus for forming a toner image on a recording material, comprising: a fixing unit configured to fix the toner image, formed on the recording material, on the recording material, the fixing unit including a heater configured to heat the toner image and a temperature detecting element configured to detect a temperature of the heater; a switching element connected in a power supply path from an AC power source to the heater, the switching element being switched depending on a heater driving signal to a conduction state in which electric power from the AC power source is supplied to the heater or to a non-conduction state in which the electric power is not supplied to the heater; an interrupting element connected in the power supply path and being put in a connection state in which the heater and the AC power source are connected to each other or an interruption state in which connection between the heater and the AC power source is interrupted; and a controller configured to control the switching element and the interrupting element on the basis of temperature information detected by the temperature detecting element, wherein in a case where the heater is raised in temperature when the interrupting element is in the connection state and the heater driving signal to the switching element is turned off, the controller switches the interrupting element from the connection state to the interruption state while keeping the heater driving signal off and switches the interrupting element from the interruption state to the connection state after a lapse of a predetermined time while keeping the heater driving signal off.

Further features of the present invention will become apparent from the following description of exemplary embodiments with reference to the attached drawings.

Figure 6:
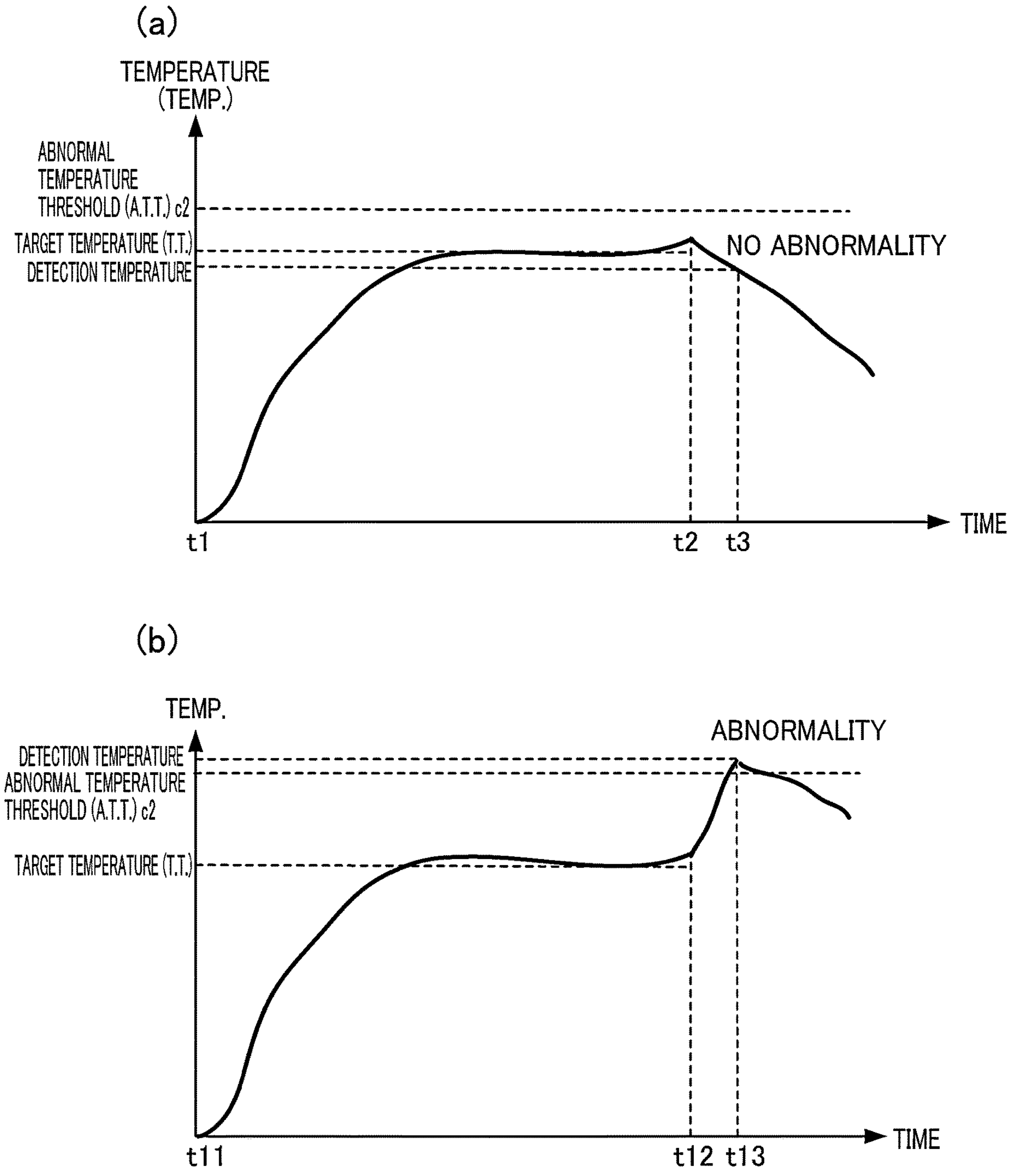

Parts (a) and (b) of FIG. 6 are graphs each showing a heater temperature change at the normal voltage and during abnormal temperature rise in the embodiment 1 or in the embodiment 2.

Figure 7:
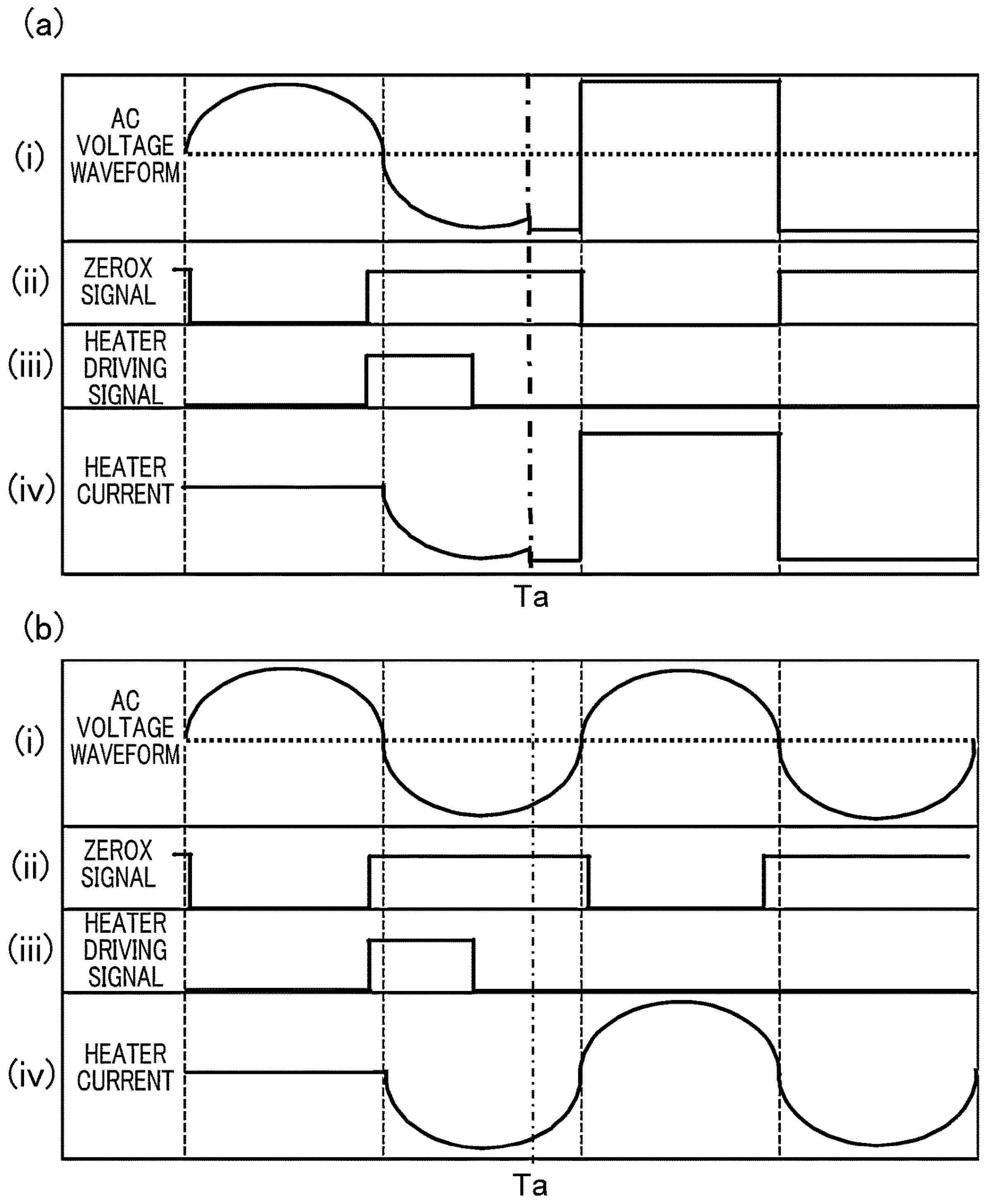

Parts (a) and (b) of FIG. 7 are time charts showing the case where a voltage waveform is graphed from a sine wave to a square wave and the case where a triac causes a short-circuit failure, respectively, in the embodiments 1 and 2.

Figure 8:
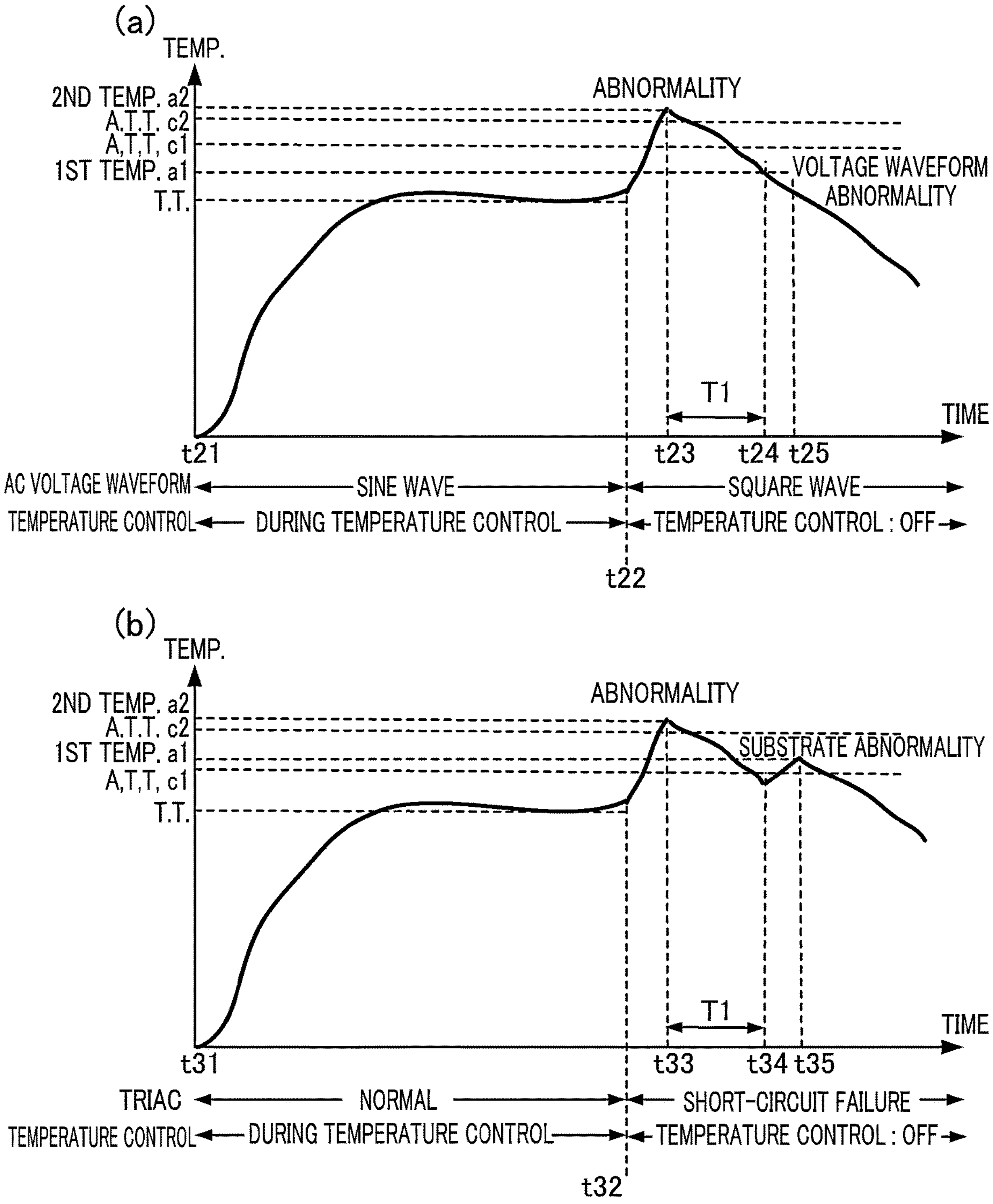

Parts (a) and (b) of FIG. 8 are graphs showing heater temperature changes in the case where the voltage waveform is changed from the sine wave to the square wave and in the case where the triac causes the short-circuit failure, respectively, in the embodiment 1.

Figure 9:
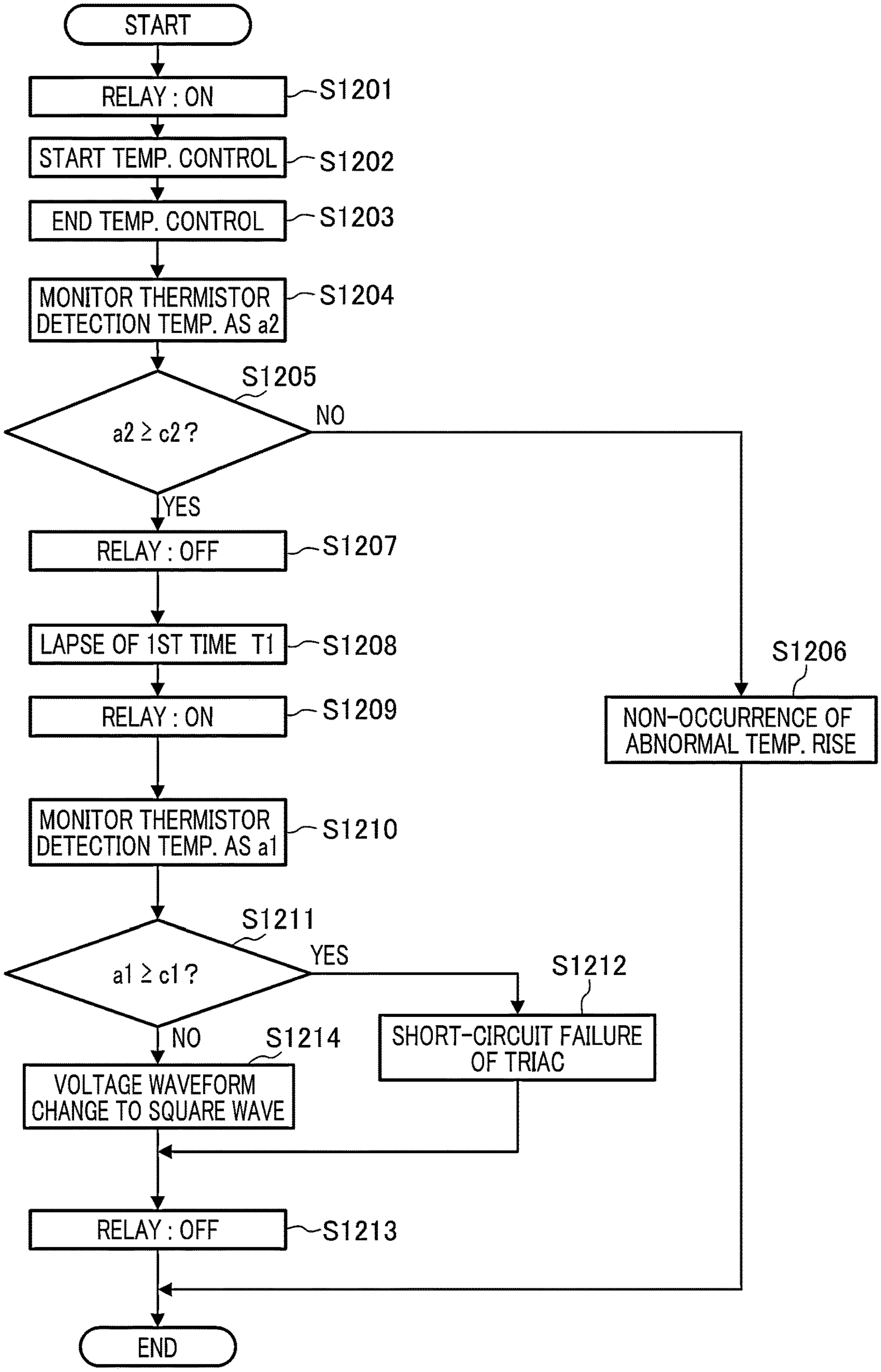

FIG. 9 is a flow chart showing processing for discriminating a cause of abnormal high-temperature in the embodiment 1.

Figure 10:
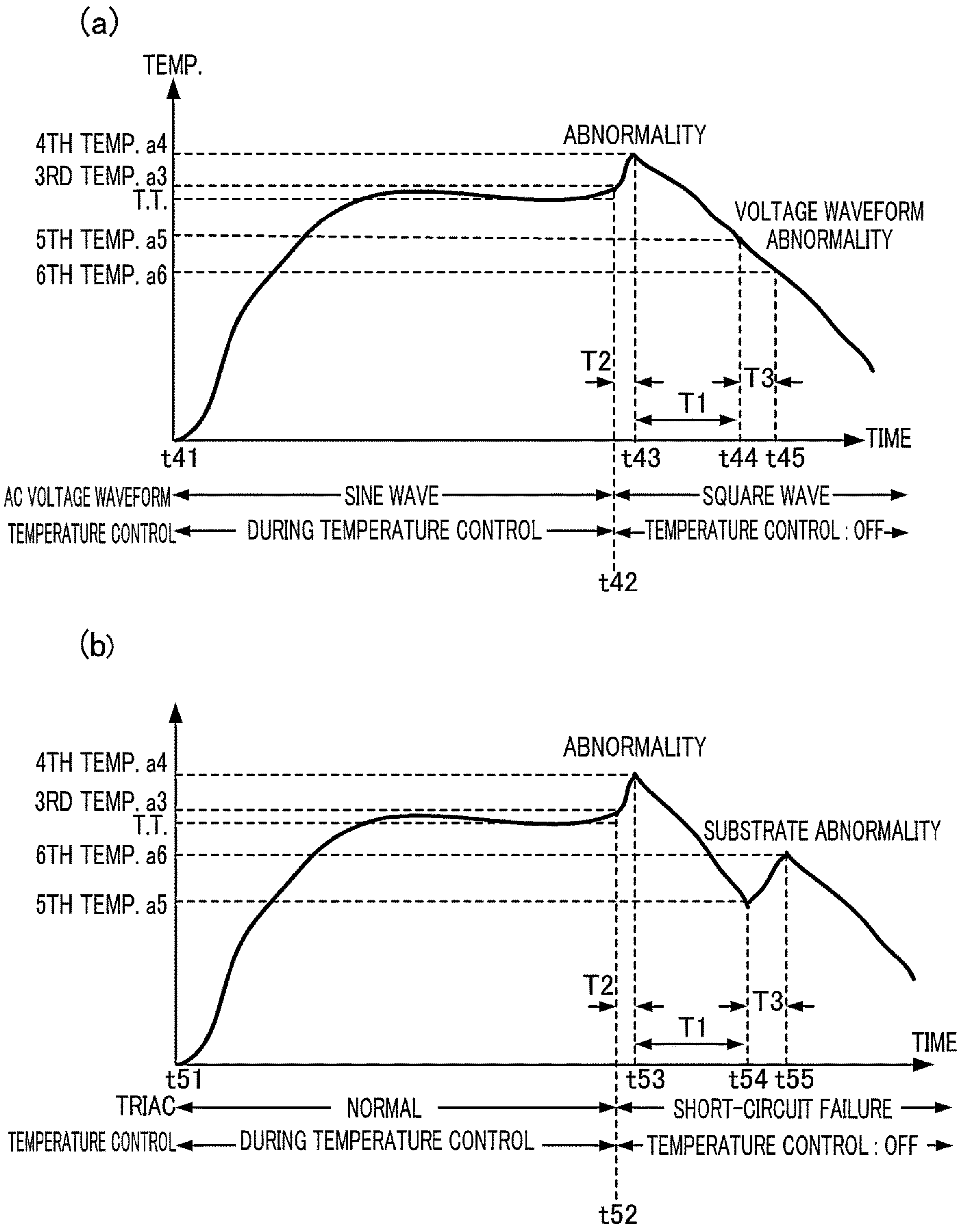

Parts (a) and (b) of FIG. 10 are graphs showing heater temperature changes in the case where the voltage waveform is changed from the sine wave to the square wave and in the case where the triac causes the short-circuit failure, respectively, in the embodiment 2.

Figure 11:
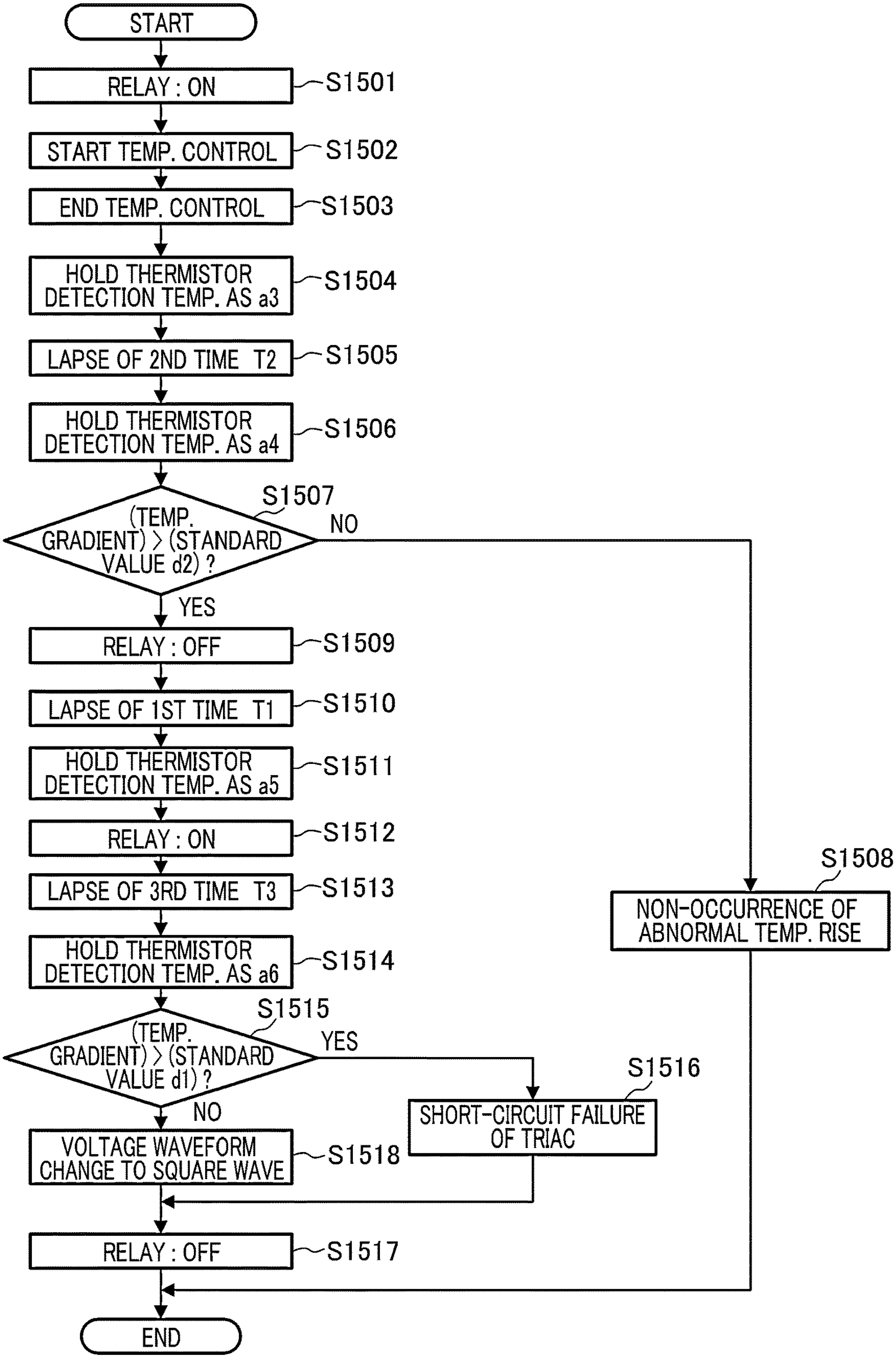

FIG. 11 is a flowchart showing processing for discriminating a cause of abnormal high-temperature in the embodiment 2.

Figure 12:
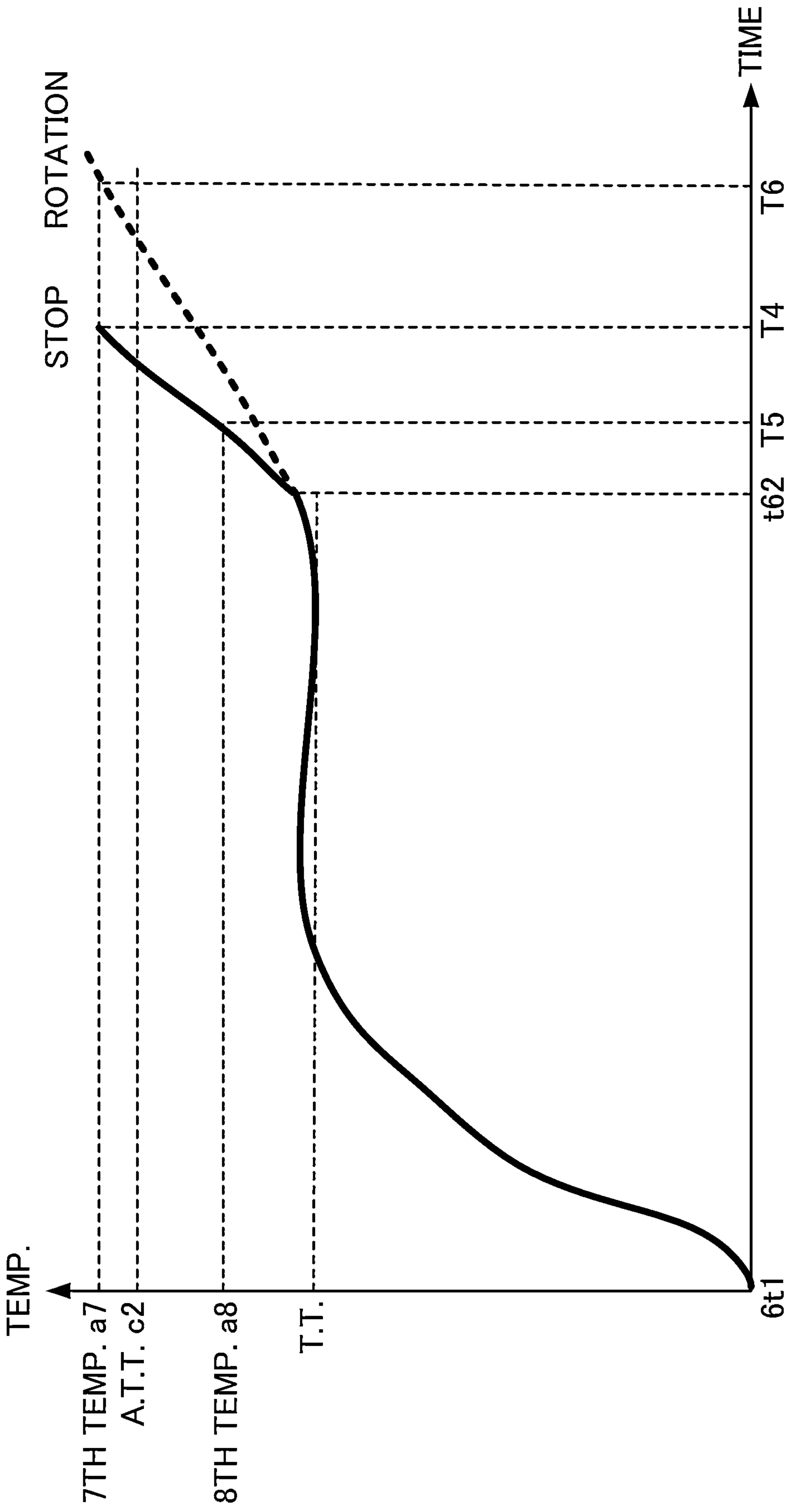

FIG. 12 is a graph showing heater temperature changes in processing of the embodiment 1 and in processing of the embodiment 2, respectively.

DESCRIPTION OF THE EMBODIMENTS

Embodiment 1

Specific constitution of the present invention for solving the above-described problem will be described based on the following embodiments. Incidentally, the embodiments described below are an example of the present invention, and a technical scope of the present invention is not intended to be limited thereto.

(Image Forming Apparatus)

Figure 1:
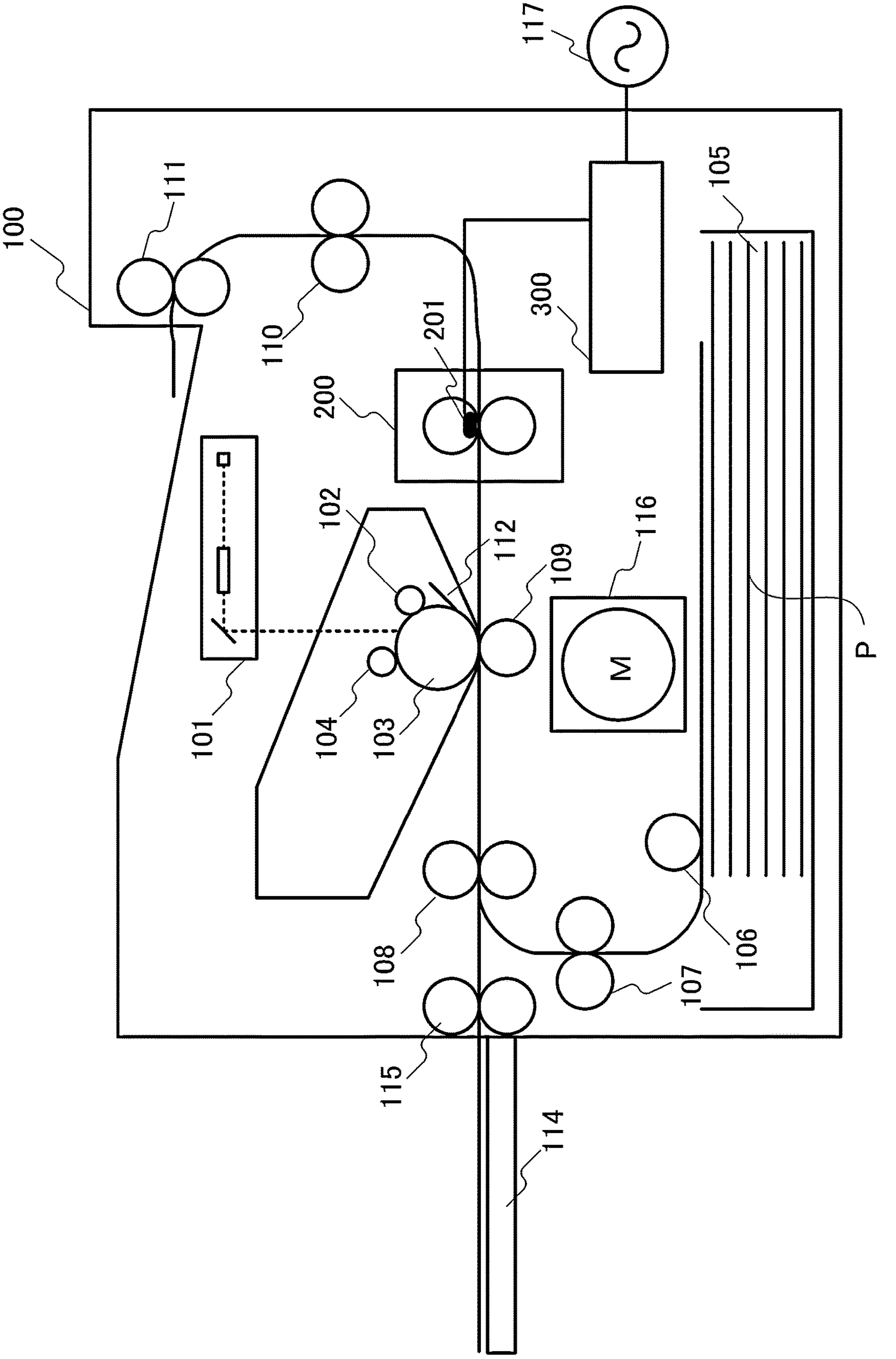
FIG. 1 is a schematic view for illustrating an image forming apparatus according to embodiments 1 and 2.

FIG. 1 is a sectional view of an image forming apparatus 100 using electrophotographic recording technique. When a print signal is generated, a scanner unit 101 emits laser light modulated depending on image information, so that a photosensitive drum 103 electrically charged to a predetermined polarity by a charging roller 102 is scanned with the laser light. By this, an electrostatic latent image is formed on the photosensitive drum 103. To this electrostatic latent image, toner is supplied from a developing device 104, so that a toner image depending on the image information is formed on the photosensitive drum 103.

On the other hand, recording paper P which is a recording material stacked on a paper (sheet) feeding cassette 105 is fed one by one by pick-up roller 106 and is conveyed toward a registration roller pair 108 by a roller pair 107. Then, the recording paper P is conveyed from the registration roller pair 108 to a transfer position in synchronism with a timing when the toner image on the photosensitive drum 103 reaches the transfer position formed by the photosensitive drum 103 and a transfer roller 109. In a process in which the recording paper P passes through the transfer position, the toner image on the photosensitive drum 103 is transferred onto the recording paper P. Thereafter, the recording paper P is heated by a heater 201 in an image heating device 200, so that the (unfixed) toner image is heat-fixed on the recording paper P. The recording paper P carrying the fixed toner image is discharged onto a tray at an upper portion of the image forming apparatus 100 by roller pairs 110 and 111.

Incidentally, a cleaner 112 cleans the photosensitive drum 103, and a paper feeding tray (manual feeding tray) 114 is a tray including a pair of recording paper regulating plates capable of adjusting a width of the recording paper P depending on a size of the recording paper P. The paper feeding tray 114 is provided so as to meet also recording paper P with a size other than regular sizes. A pick-up roller pair 115 feeds the recording paper P from the paper feeding tray 114. A motor 116 is a motor for driving the image heating device 200 or the like. From a control substrate 300 connected to an AC power source 117 electric power is supplied to the motor 116. To the heater 201 in the image heating device 200, the electric power is supplied by control of a power supplying portion 301 (see FIG. 3) connected to the AC power source 117. The photosensitive drum 103, the charging roller 102, the scanner unit 101, the developing device 104, and the transfer roller 109 which are other components described above constitute an image forming means for forming the (unfixed) toner image on the recording paper P. Incidentally, the image forming apparatus to which the present invention is applicable is not limited to the image forming apparatus 100 having the constitution of FIG. 1.

(Image Heating Device)

Figure 2:
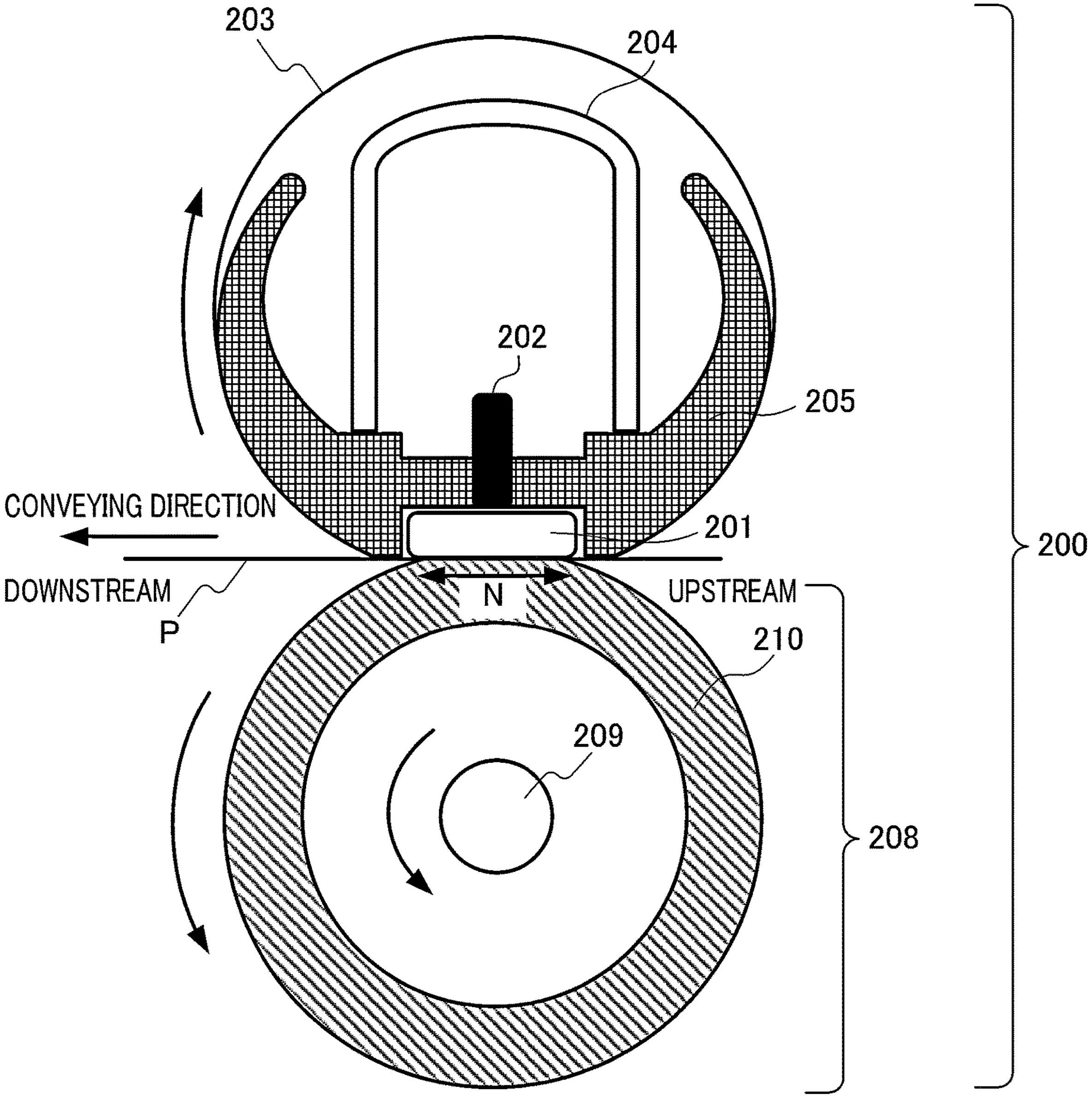
FIG. 2 is a sectional view of an image heating device in the embodiments 1 and 2.

FIG. 2 is a sectional view of the image heating device (fixing unit) 200 in the embodiment 1. The image heating device 200 includes an endless belt (hereinafter, referred to as a film) 203, the heater 201 as a heating means, a pressing roller 208 (nip-forming member), and a thermistor 202 as a temperature detecting means.

The film 203 is an endless belt, i.e., a cylindrical film. The heater 201 includes a heat generating member and contacts an inner surface of the film 203. Incidentally, the heater 201 may include a single heat generating member or a plurality of heat generating member different in length in a widthwise direction perpendicular to a conveying direction of the recording material P. The pressing roller 208 forms a fixing nip N in cooperation with the heater 201 through the film 203. The thermistor 202 detects a temperature of the heater 201.

A material of a base layer of the film 203 is a heat-resistant resin material such as polyimide or metal such as stainless steel. Further, as a surface layer of the film 203, an elastic layer of a heat-resistant rubber or the like may also be provided. The pressing roller 208 includes a core metal 209 made of a material such as iron or aluminum and an elastic layer 210 made of a material such as a silicone rubber. The heater 201 is held by a holding member 205 made of a heat-resistant resin material.

The holding member 205 also has a guiding function of guiding rotation of the film 203. A stay 204 is provided for applying pressure of an unshown spring to the holding member 205 and is made of metal. The pressing roller 208 is rotated in an arrow direction by receiving motive power from an unshown motor. By rotation of the pressing roller 208, the film 203 is rotated. The recording paper P carrying thereon the (unfixed) toner image is heated and subjected to a fixing process while being nipped and conveyed in the fixing nip N.

(Heater Driving Circuit)

Figure 3:
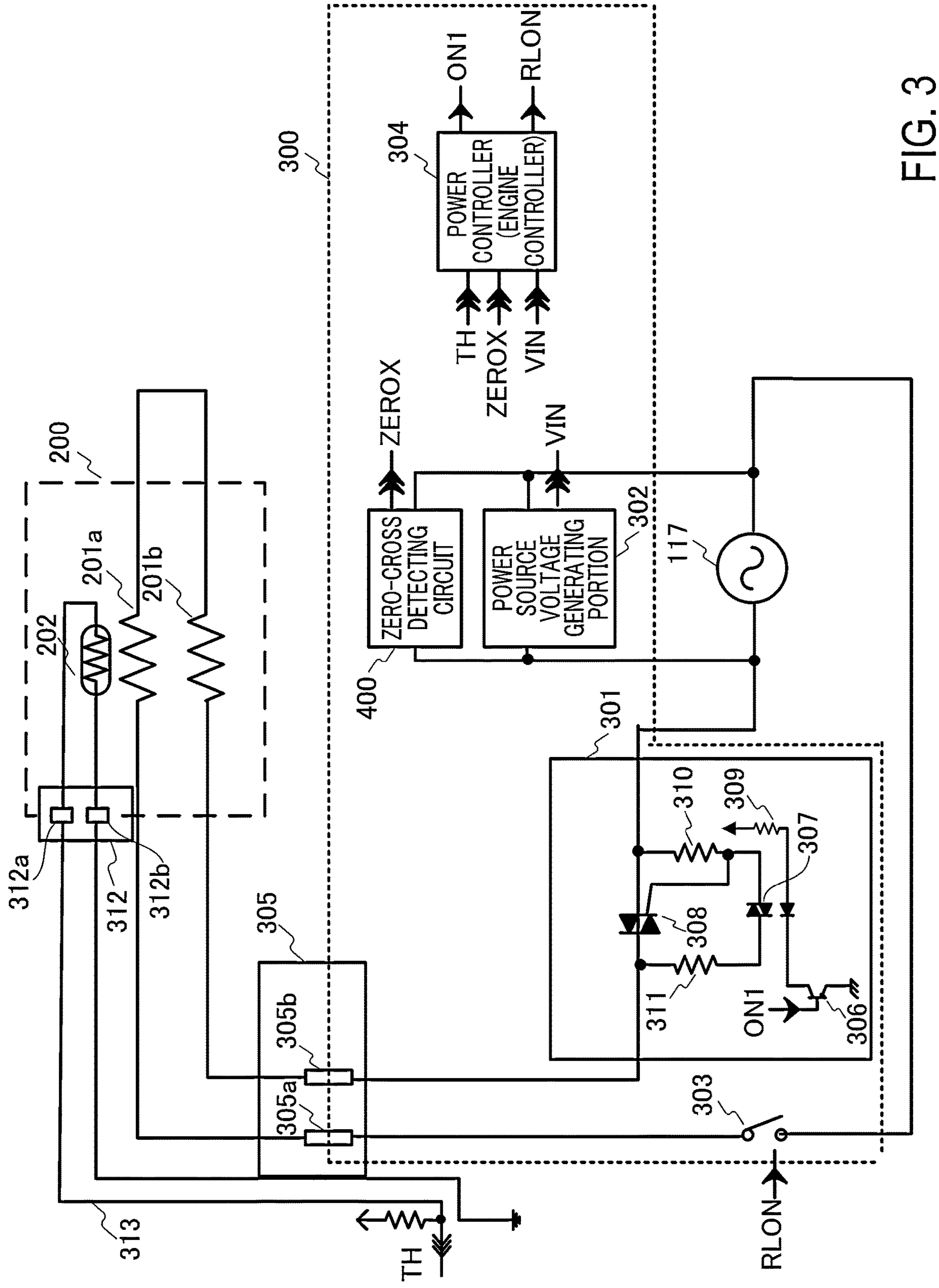
FIG. 3 is a schematic view of a control circuit constitution of the image heating device in the embodiments 1 and 2.

FIG. 3 shows the control substrate 300 for controlling power supply from the AC power source 117 to the image heating device 200 in the embodiment 1. The control substrate 300 is constituted by the power supplying portion 301, a zero-cross detecting circuit 400, a power source voltage generating portion 302, a relay 303, and a power controller 304 (hereinafter, referred to as an engine controller 304).

The power supplying portion 301 includes a transistor 306, a bidirectional thyristor (hereinafter, referred to as a triac) 308, a phototriac coupler 307, and resistors 309, 310, and 311. The power supplying portion 301 is connected to one side (one end) of the AC power source 117 and is connected to the image heating device 200 via a connection terminal 305*b* in an AC connector 305. The relay 303 is connected to the other end of the AC power source 117 and is an interrupting element put in a connection state in which the relay 303 connects the heater 201 and the AC power source 117 and an interruption state in which the relay 303 interrupts the connection between the heater 201 and the AC power source 117.

The heater 201 includes, for example, two heat generating elements 201*a* and 201*b*, and the heat generating elements 201*a* and 201*b* are connected in series with each other. Further, the AC connector 305 includes connection terminals 305*a* and 305*b* is connected to the relay 303 at one end thereof and is connected to the heat generating element 201*a* at the other end thereof. The connection terminal 305*a* is connected to the relay 303 at one end thereof and is connected to the heat generating element 201*a* at the other end thereof. The connection terminal 305*b* is connected to the power supplying portion 301 at one end thereof and is connected to the heat generating element 201*b* at the other end thereof. The thermistor 202 is connected to a connection terminal 312*a* of a connector 312 at one end thereof, and the connection terminal 312*a* is connected to the engine controller 304 in order to output a signal TH corresponding to temperature information. The thermistor 202 is connected to a connection terminal 312*b* at the other end thereof, and the connection terminals 312*b* is grounded (GND).

The engine controller 304 functions as a control means for controlling the triac 308 and the relay 303 on the basis of information on the temperature of the heater 201 detected by the thermistor 202. A current flows through the phototriac coupler 307 via the transistor 306 turned on by a heater driving signal ON1 outputted from the engine controller 304. As a result, the current flows through a gate of the triac 308, so that the triac 308 is in an ON state. The triac 308 performs a function as a switching element for controlling electric power supplied to the heater 201, and the triac 308 is put in the ON state, so that the current flows through the heater 201 and thus the heater 201 generates heat. The triac 308 is connected to the one end of the AC power source 117 and is a switching element for carrying out control so that the temperature of the heater 201 becomes a target temperature, by being put in a conduction state in which the electric power from the AC power source 117 is supplied to the heater 201 or in a non-conduction state in which the electric power is not supplied to the heater 201.

Both the zero-cross detecting circuit 400 and the power source voltage generating portion 302 are connected to the AC power source 117. The zero-cross detecting circuit 400 outputs, to the engine controller 304, a zero-cross signal ZEROX showing a zero-cross point of a waveform of an AC voltage of the AC power source 117 (hereinafter, this waveform is referred to as an AC waveform). Incidentally, the zero-cross point is a timing when the AC waveform is connected in polarity from positive to negative or from negative to positive.

The power source voltage generating portion 302 generates a power source voltage VIN, from the AC waveform, necessary for operations of the engine controller 304 and other portions. The engine controller 304 performs a function as a controller of the image forming apparatus 100. On the basis of temperature information (signal TH) sent from the thermistor 202 inside the image heating device 200 via a DC bundle wire 313, the engine controller 304 controls the power supplying portion 301 via the heater driving signal ON1 so that a detection temperature becomes a predetermined temperature. Further, when the engine controller 304 detects abnormal temperature rise of the heater 201 from the temperature information sent from the thermistor 202, the engine controller 304 prevents heat generation of the heater 201 by interrupting the relay 303 as an interrupting element. The engine controller 304 outputs a signal RLON, and thus connections and interrupts the relay 303.

(Explanation of Zero-Cross Circuit)

Figure 4:
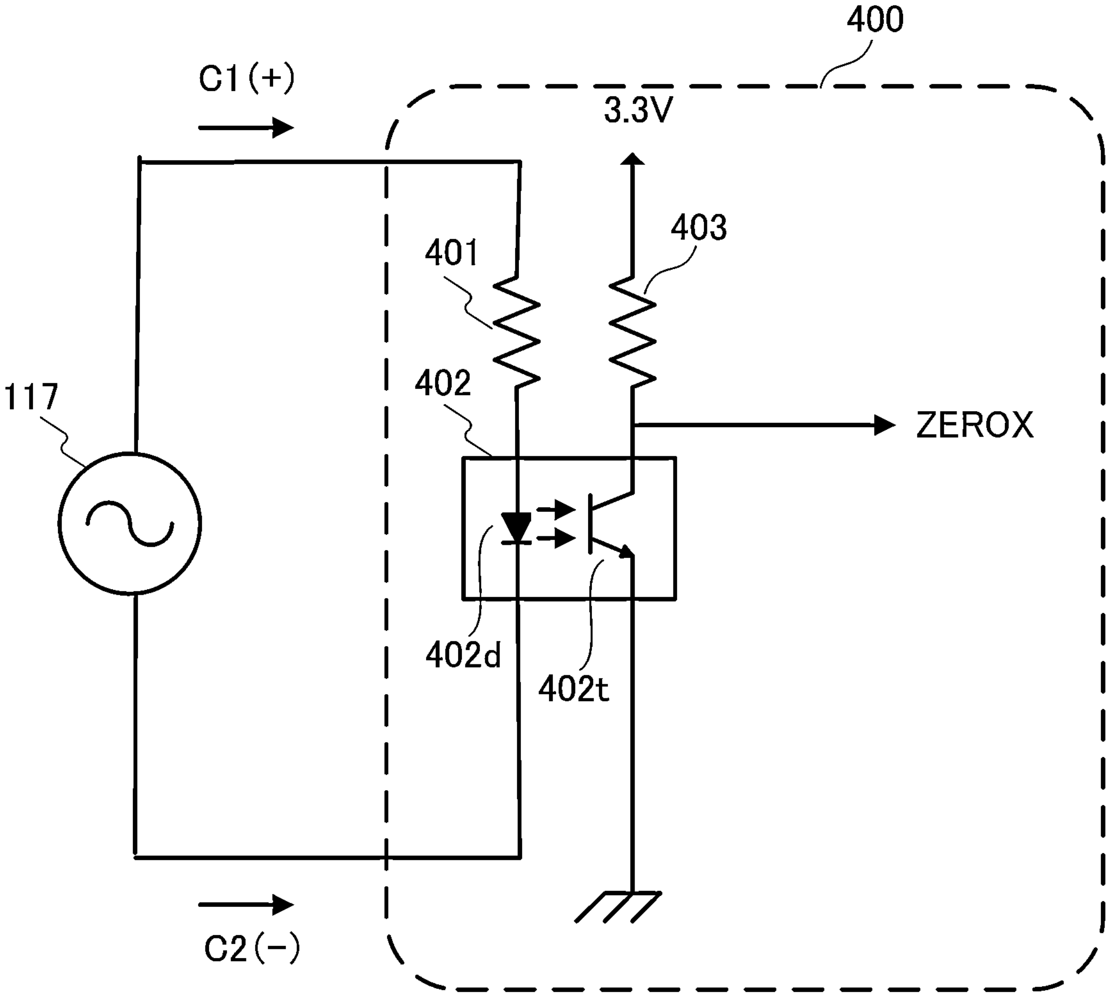
FIG. 4 is a zero-cross detection circuit diagram in the embodiments 1 and 2.

FIG. 4 shows the zero-cross detecting circuit 400 in the embodiment 1. In a period in which a voltage is applied from the AC power source 117 in a C1 direction (hereinafter, this direction is referred to as positive (+)), a current passes through a pull-down resistor 401 and thereafter flows through a diode 402*d* of a photocoupler 402. As a result, a secondary-side transistor 402*t* is turned on, so that a current passed through a pull-down resistor 403 flows through between a collector and an emitter, with the result that the zero-cross signal ZEROX outputs a low level (hereinafter, referred to as L) (which is the same level as GND).

On the other hand, in a period in which the voltage is applied from the AC power source 117 in a C2 direction (hereinafter, this direction is referred to as negative (−)), the voltage in a direction opposite to the C1 direction is applied to the diode 402*d* of the photocoupler 402, and therefore, the current does not flow. The secondary-side transistor 402*t* is turned off, and therefore, the zero-cross signal ZEROX outputs a high level (hereinafter, referred to as H) through the pull-down resistor 403 from 3.3 V.

By the operation as described above, a rising edge from the low level to the high level of the zero-cross signal ZEROX synchronizes with a zero-cross point where the voltage of the AC power source 117 is changed from the positive to the negative. Further, a falling edge from the high level to the low level of the zero-cross signal ZEROX can synchronize with a zero-cross point where the voltage of the AC power source 117 is changed from the negative to the positive.

(Normal Heater Driving Circuit Operation)

Figure 5:
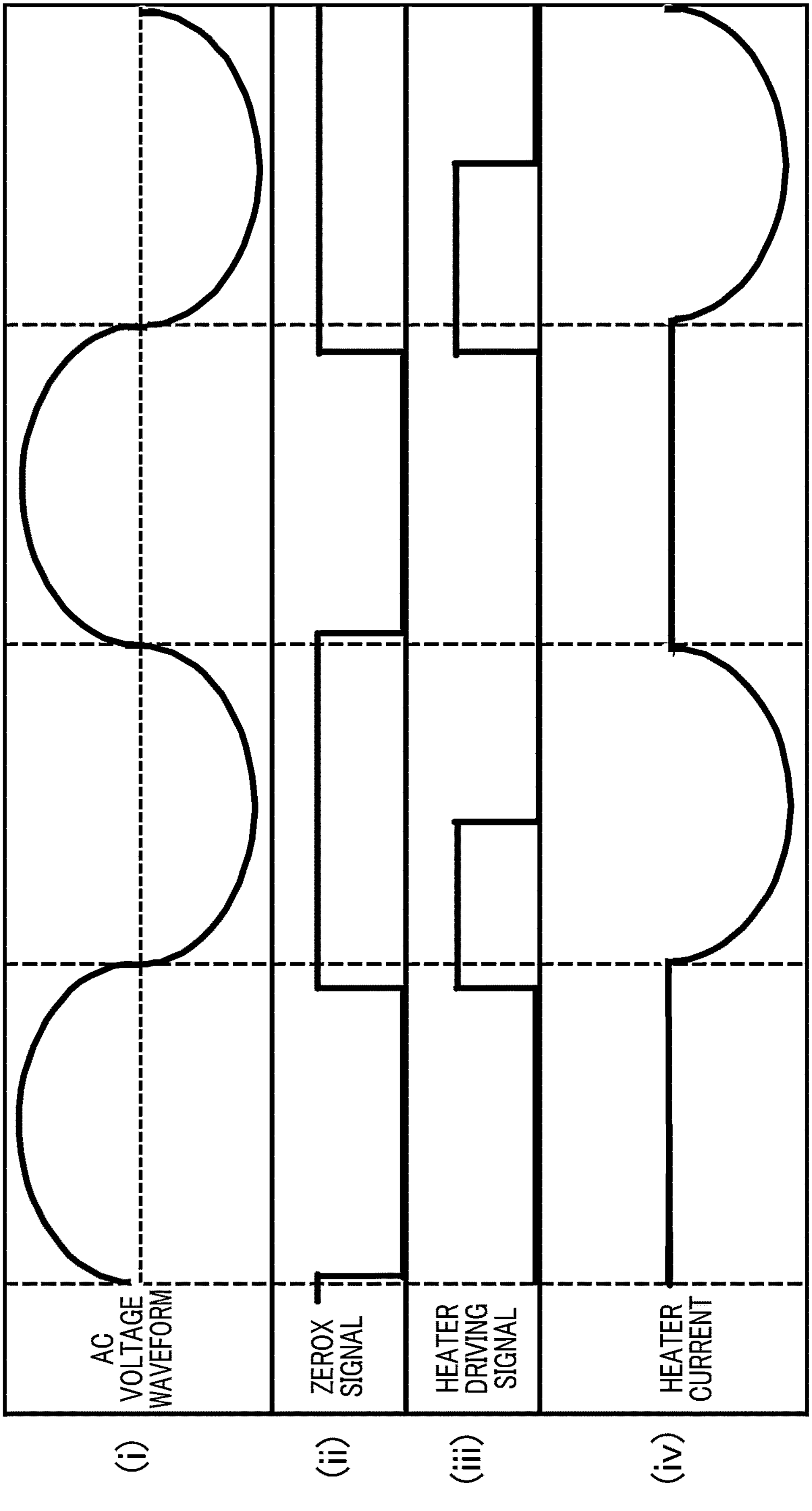
FIG. 5 is a schematic view showing a waveform at a normal voltage in the embodiments 1 and 2.

FIG. 5 shows a relationship between an input voltage, the zero-cross signal ZEROX, the heater driving signal ON1, and a heater current flowing through the heater 201, with time when an AC voltage of the sine wave is applied from the AC power source 117 to the normal control substrate 300 in which failure does not occur. In FIG. 5, (i) shows a graph showing the waveform of the AC voltage, (ii) shows a graph showing the ZEROX signal, (iii) shows a graph showing the heater driving signal ON1 which is a driving signal of the heater 201, and (iv) shows a current flowing through the heater 201. Incidentally, in (iii), in the case where the current is caused to flow through the heater 201, the heater driving signal ON1 is turned on (high level).

On the basis of a setting temperature (target temperature) of the heater 201 and a detection temperature of the thermistor 202, the engine controller 304 calculates electric power to be supplied to the heater 201. Next, the engine controller 304 converts the calculated electric power into a wave number (control level) of the AC waveform caused to flow through the heater 201. Then, the engine controller 304 transmits the heater driving signal ON1 depending on the converted control condition (control level), and it thus controls the triac 308. By this, the heater current flows through the heater 201. This control is referred to as temperature control of the heater 201.

(Temperature Change of Heater in Temperature Control During Normal Operation)

Part (a) of FIG. 6 is a graph showing a relationship between an elapsed time from a start of the temperature control in a normal print operation and the detection temperature of the thermistor 202. Incidentally, in part (a) of FIG. 6, a target temperature (setting temperature) of the heater 201 and an abnormal temperature threshold c2 are indicated by broken line. Further, t1 to t3 show respective timings.

It is understood that from a start of the temperature control at the timing t1, a temperature detected by the thermistor 202 fluctuates in the vicinity of the target temperature and that after the timing t2 when the temperature control ends, a temperature of the thermistor 202 lowers. An abnormal temperature threshold for detecting that the heater 201 causes abnormal temperature rise is c2.

In part (a) of FIG. 6, the detection temperature of the thermistor 202 does not exceed the abnormal temperature threshold c2. For this reason, the engine controller 304 can discriminate that the abnormal temperature rise of the heater 201 does not occur and can discriminate that the image forming apparatus 100 is in a normal state at the timing t3.

(Explanation of Cause of Abnormality of Temperature of Heater 201)

In the case where the input voltage of the AC power source 117 is changed from the sine wave to the square wave or in the case where the triac 308 causes short-circuit failure, the abnormal temperature rise of the heater 201 occurs. Part (b) of FIG. 6 is a graph showing a relationship between the elapsed time from the start of the temperature control and the detection temperature of the thermistor 202 in the case where occurrence of the temperature rise of the heater 201 is detected at a timing when the heater 201 does not originally cause the temperature rise, and is the graph similar to the graph of part (a) of FIG. 6. Further, t11 to t13 show respective timings. The timing t11 is a timing of the start of the temperature control similarly as the timing t1, and the timing t12 is a timing of the end of the temperature control similarly as in the timing t2.

The engine controller 304 discriminates that the detection temperature of the thermistor 202 exceeds the abnormal temperature threshold c2 at the timing t13 after the end of the temperature control at the timing t12.

In this case, the engine controller 304 discriminates that the abnormal temperature rise of the heater 201 occurs. For this reason, the engine controller 304 interrupts the relay 303 at the timing t13. By interrupting the current flowing through the heater 201 by interruption of the relay 303, it is possible to stop the temperature rise of the thermistor 202. However, only by this control, the engine controller 304 cannot discriminate the cause of the occurrence of the abnormal temperature rise of the heater 201.

(Two Causes of Abnormal Temperature Rise of Heater)

There are two cases where the abnormal temperature rise of the heater 201 occurs although the temperature control of the image heating device 200 is ended. A first case of the two cases is the case where the cause is such that the voltage waveform of the AC power source 117 is changed from the sine wave to the square wave. Part (a) of FIG. 7 shows a relationship between respective waveforms at respective times in the case where the voltage applied from the AC power source 117 is changed from the sine wave to the square wave in a state in which the electric power is supplied to the heater 201, and is a graph similar to the graph of FIG. 5.

The input voltage is changed from the sine wave to the square wave at a timing Ta. In the case where the triac 308 is in a state in which the temperature of the triac 308 itself is raised after being turned on once and where inclinations of the current and the voltage applied to the triac 308 become abrupt, the triac 308 goes into a commutation failure state in which the current for power supply cannot be turned off. In part (a) of FIG. 7, at the timing Ta when the input voltage is changed from the sine wave to the square wave. As a result, after the timing Ta, although the heater driving signal ON1 is in an OFF state ((iii)), a state in which the current continuously flows through the heater 201 is formed ((iv)). As a result, the abnormal temperature rise of the heater 201 occurs. In this case, the cause of the occurrence of the abnormality is due to the voltage waveform of the AC power source 117. There is no abnormality in the control substrate 300 itself, and therefore, there is no necessity of substrate exchange of the control substrate 300. Here, if discrimination that the control substrate 300 caused the abnormality is made, an unnecessary substrate exchange is made, and therefore, a cost and lost time until recovery of the image forming apparatus 100 occur, so that it is disadvantageous to a user.

A second case of the above-described two cases where the abnormal temperature rise of the heater 201 occurs is the case where the triac 308 of the control substrate 300 causes the short-circuit failure. Part (b) of FIG. 7 shows a relationship between respective waveforms at respective timings in the case where the voltage applied from the AC power source 117 is the sine wave, but the triac 308 caused the short-circuit failure at the timing Ta when the temperature control is ended, and is a graph similar to the graph of FIG. 5.

When the triac 308 causes the short-circuit failure, after the timing Ta, although the heater driving signal ON1 is in the OFF state ((iii)), a state in which the current continuously flows through the heater 201 is formed ((iv)). As a result, the abnormal temperature rise of the heater 201 occurs. In this case, the triac 308 itself of the control substrate 300 fails, and therefore, if the substrate exchange of the control substrate 300 is not made, the image forming apparatus 100 cannot be recovered. From the above, in order to reduce the loss time until the recovery of the image forming apparatus 100, in the case where the abnormal temperature rise of the heater 201 occurred, a cause thereof is grasped as described in the following, and then necessity of the substrate exchange of the control substrate 300 is discriminated.

(Grasping Method of Failure Cause)

(Case where Square Wave is Cause)

Part (a) of FIG. 8 is a graph showing a relationship between the elapsed time from the start of the temperature control and the detection temperature of the thermistor 202 in the case where the cause of the occurrence of the abnormal temperature rise of the heater 201 in the embodiment 1 is due to the change in voltage waveform of the AC power source 117 from the sine wave to the square wave. Part (a) of FIG. 8 is the graph similar to the graph of part (a) of FIG. 6. Incidentally, below the graph of part (a) of FIG. 8, a state of the AC voltage waveform (sine wave, square wave) and a state of temperature control (during temperature control, temperature control: OFF) are also shown. Further, timings t21 to t25 are respective timings.

A temperature detected as being abnormal in the case where the detection temperature of the thermistor 202 after the temperature control is started at the timing t21 and then is ended at the timing t22 reaches the temperature is defined as the abnormal temperature threshold c2 as a second predetermined value. Incidentally, at the timing t22, the heater driving signal is OFF. On or after the timing t22, in the case where the abnormal temperature rise occurs although the heater driving signal is OFF, the engine controller 304 interrupts the relay 303 once at the timing t23 and then turns on the relay 303 again at the timing t24. A temperature detected as being abnormal in the case where the detection temperature of the thermistor 202 reaches the temperature after the timing t24 is defined as an abnormal temperature threshold c1 as a first predetermined value (predetermined value) determined in advance. Incidentally, the abnormal temperature threshold c1 is lower than the abnormal temperature threshold c2 (c1<c2).

The engine controller 304 monitors the detection temperature of the thermistor 202 as a second temperature a2 after the timing t22 when the temperature control is ended. When the engine controller 304 detects that the second temperature a2 is the predetermined abnormal temperature threshold c2 or more (second predetermined value or more), the engine controller 304 discriminates that the abnormal temperature rise of the heater 201 occurs (that the temperature rise is abnormal). Then, the engine controller 304 turns off the relay 303 at the timing t23.

Incidentally, although the engine controller 304 turns off the relay 303 at the timing t23 when the second temperature a2 is the abnormal temperature threshold c2 or more, the timing when the relay 303 is turned off may be within a first time T1 (predetermined time) from the timing t23. The engine controller 304 turns off the relay 303 in the predetermined first time T1, so that the engine controller 304 not only prevents the temperature rise of the triac 308 due to the power supply but also prevents sticking between the film 203 and the pressing roller 208 by lowering the temperature in the image heating device 200.

At the timing t24 after a lapse of the first time T1 from the timing t24 of the turning-off of the relay 303, the engine controller 304 turns on the relay 303. Here, in part (a) of FIG. 8, failure of the control substrate 300 does not occur (heater driving signal is OFF), and therefore, only by turning on the relay 303, the current does not flow through the heater 201. Further, the temperature of the triac 308 is also lowered sufficiently, and therefore, the triac 308 does not go into the commutation failure state in which the current for the power supply cannot be turned off.

Therefore, when the detection temperature of the thermistor 202 is monitored as the first temperature a1, the first temperature a1 in this case is less than the abnormal temperature threshold c1 (first predetermined value). By the above-described control, the engine controller 304 detects the first temperature a1 by the thermistor 202 after the relay 303 is once turned off and then turned on again. Then, when the detected first temperature a1 is the predetermined abnormal temperature threshold c1 or less, the engine controller 304 is capable of discriminating that the cause of the abnormal temperature rise of the heater 201 is due to the change in voltage waveform of the AC power source 117 from the sine wave to the square wave.

(Case where Triac is Cause)

Part (b) of FIG. 8 is a graph showing a relationship between the elapsed time from the start of the temperature control and the detection temperature of the thermistor 202 in the case where the cause of the occurrence of the abnormal temperature rise of the heater 201 is due to the short-circuit failure of the triac 308, and is the graph similar to the graph of part (a) of FIG. 6. Incidentally, below the graph of part (b) of FIG. 8, a state of the triac 308 (normal, short-circuit failure) and a state of temperature control (during temperature control, temperature control: OFF) are also shown. Further, timings t31 to t35 are respective timings.

Similarly as in part (a) of FIG. 8, a temperature detected as being abnormal in the case where the detection temperature of the thermistor 202 after the temperature control is started at the timing t31 and then is ended at the timing t32 reaches the temperature is defined as the abnormal temperature threshold c2. The engine controller 304 interrupts the relay 303 once at the timing t33 and then turns on the relay 303 again at the timing t34. Then, a temperature detected as being abnormal in the case where the detection temperature of the thermistor 202 reaches the temperature after the timing t34 is defined as an abnormal temperature threshold c1.

The engine controller 304 monitors the detection temperature of the thermistor 202 as a second temperature a2 after the end of the temperature control at the timing t32. When the engine controller 304 detects that the detected second temperature a2 is the predetermined abnormal temperature threshold c2 or more, the engine controller 304 discriminates that the abnormal temperature rise of the heater 201 occurs, and 304 turns off the relay 303 at the timing t33.

Similarly as in part (a) of FIG. 8, the engine controller 304 turns off the relay 303 after the abnormal discrimination, so that the engine controller 304 prevents sticking between the film 203 and the pressing roller 208 by lowering the temperature in the image heating device 200.

The engine controller 304 turns on the relay 303 at the timing t34 after a lapse of the first time T1 from the timing t33 of the turning-off of the relay 303.

Here, in part (b) of FIG. 8, the short-circuit failure of the triac 308 occurs, and therefore, as soon as the relay 303 is turned on, the current flows through the heater 201, so that the detection temperature of thermistor 202 rises. Therefore, when the detection temperature of the thermistor 202 is monitored as the first temperature a1, the first temperature a1 becomes the abnormal temperature threshold c1 (first predetermined value) or more. When the first temperature a1 detected by the thermistor 202 on or after the timing t34 is the predetermined abnormal temperature threshold c1 or more, the engine controller 304 is capable of discriminating that the cause of the abnormal temperature rise of the heater 201 is due to the short-circuit failure of the triac 308.

As described above, when the abnormal temperature rise of the heater 201 occurs, the engine controller 304 turns off the relay 303. The engine controller 304 turns on the relay 303 after a lapse of a certain time from the turning-off of the relay 303, and then it causes the thermistor 202 to detect the temperature. The engine controller 304 is capable of discriminating the cause of the occurrence of the abnormal temperature rise of the heater 201 by a state of the detection temperature by the thermistor 202.

(Flowchart of Discrimination of Cause of Temperature Rise)

FIG. 9 shows a flowchart of the operation of the image forming apparatus 100 in the embodiment 1.

In a step (hereinafter, referred to as S) 1201, the engine controller 304 puts the relay 303 in a driving state (ON) as a normal image forming operation. In S1202, the engine controller 304 starts the temperature control of the heater 201. In S1203, the engine controller 304 ends the temperature control of the heater 201, and it puts the triac 308 in a state in which the triac 308 is not driven (non-conduction state). In S1204, the engine controller 304 monitors the detection temperature of the thermistor 202 as the second temperature a2.

In S1205, the engine controller 304 discriminates whether or not the second temperature a2 detected in S1204. In the case where the engine controller 304 discriminated in S1205 that the second temperature a2 is not the abnormal temperature threshold c2 or more, the engine controller 304 causes the processing to go to S1206. In S1206, the engine controller 304 discriminates that the abnormal temperature rise of the heater 201 does not generate, and it then ends the processing. In the case where the engine controller 304 discriminated in S1205 that the second temperature a2 is the abnormal temperature threshold c2 or more, the engine controller 304 causes the processing to go to S1207.

In this case, the engine controller 304 discriminates that the abnormal temperature rise of the heater 201 occurred, and in S1207, the relay 303 is interrupted (OFF) in order to prevent sticking between the film 203 and the pressing roller 208. At a stage of S1207, the cause of the abnormal temperature rise of the heater 201 cannot be properly selected between the change in voltage waveform of the AC power source 117 from the sine wave to the square wave (part (a) of FIG. 8) and the short-circuit failure of the triac 308 of the control substrate 300 (part (b) of FIG. 8).

In order to properly select the cause of the abnormal temperature rise, after the first time T1 has elapsed in S1208, the engine controller 304 turns on the relay 303 in S1209. Incidentally, the engine controller 304 includes a timer (not shown) and measures an elapsed time from the turning-off of the relay 303 in S1207. In S1210, the engine controller 304 monitors the detection temperature of the thermistor 202 as the first temperature a1.

In S1211, the engine controller 304 discriminates whether or not the first temperature a1 detected in S1201 is the abnormal temperature threshold c1 or more. In the case where the engine controller 304 discriminated in S1211 that the first temperature a1 is the abnormal temperature threshold c1 or more, the engine controller 304 causes the processing to go to S1212. In S1212, the engine controller 304 discriminates that the triac 308 causes the short-circuit failure and causes the processing to go to S1213. In S1213, the engine controller 304 interrupts the relay 303 (OFF) in order to prevent sticking between the film 203 and the pressing roller 208 in the image heating device 200, and it then ends the processing.

In the case where the engine controller 304 discriminated in S1211 that the first temperature a1 is not the abnormal temperature threshold c1 or more, the engine controller 304 causes the processing to go to S1214. In S1214, the engine controller 304 discriminates that the voltage waveform of the AC power source 117 changed from the sine wave to the square wave, and it interrupts the relay 303 (OFF) in S1213 and then ends the processing.

Thus, in the case where the engine controller 304 discriminates that the temperature rise of the heater 201 is abnormal in a state in which the triac 308 is put in the non-conduction state and the relay 303 is put in the connection state, the engine controller 304 carries out the following control. After the relay 303 is put in the interruption state and a predetermined time determined in advance has elapsed, the engine controller 304 puts the relay 303 in the connection state and then compares the detection temperature of the heater 201 detected by the thermistor 202 and a predetermined value determined in advance with each other. Then, on the basis of a comparison result, the engine controller 304 discriminates the cause that the temperature rise became abnormal.

By the above-described flow chart, it becomes possible to properly select whether the cause of occurrence of the abnormal temperature rise of the heater 201 is due to the change in AC power source 117 from the sine wave to the square wave or due to the short-circuit failure of the triac 308 of the control substrate 300. In the embodiment 1, the abnormal temperature threshold c1 and the abnormal temperature threshold c2 are different values, but they may also be the same value. Further, in the case where the image forming apparatus 100 is provided with a display portion, the engine controller 304 may cause the display portion to display a discrimination result of S1212 or S1214 to notify the user of the discrimination result.

As described above, according to the embodiment 1, when the heating member became the abnormally high temperature, the cause thereof can be discriminated.

Embodiment 2

(Grasping Method of Failure Cause)

(Case where Square Wave is Cause)

In an embodiment 2, a control method for detecting the abnormal temperature rise of the heater 201 from a temperature gradient of the heater 201 acquired from a temperature detected by the thermistor 202 and an elapsed time will be described. Part (a) of FIG. 10 is a graph showing a relationship between the elapsed time from the start of the temperature control and the detection temperature of the thermistor 202 in the case where the cause of the abnormal temperature rise of the heater 201 in the embodiment 2 is due to the square wave. Part (a) of FIG. 10 is the graph similar to the graph of part (a) of FIG. 8. Further, timings t41 to t45 are respective timings.

After the temperature control starting at the timing t41 and ending at the timing t42, the engine controller 304 causes the thermistor 202 to detect a third temperature a3 and then causes the thermistor 202 to detect a fourth temperature a4 at the timing t43 after a lapse of a second time T2 (third time) from the timing t42. The engine controller 304 calculates a temperature gradient (referred to as a second temperature gradient) of the heater 201 from the third temperature a3, the fourth temperature a4, and the second temperature T2. Here, the engine controller 304 compares the calculated second temperature gradient of the heater 201 and a second temperature gradient standard value d2 (temperature gradient standard value) of the heater 201 determined in advance with each other. The second temperature gradient standard value d2 defines a time, a different temperature, and the number of times of detection which are for detecting the temperature gradient, and defines, for example, a standard value such that "temperature rise of 10° C. is detected two times in 5 seconds".

In the case where the temperature rise of the heater 201 such that the second temperature gradient exceeds the second temperature gradient standard value d2 is detected, the engine controller 304 discriminates that the abnormal temperature rise of the heater 201 occurs and then turns off the relay 303 (OFF) at the timing t43. Incidentally, the timing t43 may also be during the first time T1. By this, sticking by the film 203 and the pressing roller 208 by lowering the temperature in the image heating device 200 is prevented, and in addition, the temperature rise of the triac 308 due to power supply is prevented. At the timing t44 after a lapse of the first time T1 (predetermined time), the engine controller 304 turns on the relay 303 (ON).

In part (a) of FIG. 10, failure of the control substrate 300 does not occur, and therefore, even when the relay 303 is turned on at the timing t44, the current does not flow through the heater 201. Further, the temperature of the triac 308 is also lowered sufficiently, and therefore, the triac 308 does not go into the commutation failure state in which the current for the power supply cannot be turned off. That is, even when the relay 303 is turned on (ON), the current does not flow through the heater 201, so that the detection temperature of the thermistor 202 does not increase.

The engine controller 304 turns on the relay 303 (ON) at the timing t44. The engine controller 304 causes the thermistor 202 again to detect a fifth temperature a5 (first temperature) and then causes the thermistor 202 to detect a sixth temperature (second temperature) at a timing t45, after a lapse of a third time T3 (second time). The engine controller 304 calculates a first temperature gradient of the heater 201 from the fifth temperature a5, the sixth temperature a6, and the third time T3. In the case where the calculated first temperature gradient is detected as being the predetermined first temperature gradient standard value d1 or less, the engine controller 304 is capable of discriminating that the cause of the abnormal temperature rise of the heater 201 is due to abnormality of the voltage waveform of the AC power source 117.

(Case where Triac is Cause)

Part (b) of FIG. 10 is a graph showing a relationship between the elapsed time from the start of the temperature control and the detection temperature of the thermistor 202 in the case where the triac 308 caused the short-circuit failure, and it is the graph similar to the graph of part (a) of FIG. 8. Further, timings t51 to t55 are respective timings.

After the temperature control starting at the timing t51 and ending at the timing t52, the engine controller 304 causes the thermistor 202 to detect a third temperature a3 and then to detect a fourth temperature a4 at the timing t53 after a lapse of a second time T2. The engine controller 304 calculates a second temperature gradient of the heater 201 from the third temperature a3, the fourth temperature a4, and the second time T2. Here, in the case where the calculated second temperature gradient of the heater 201 exceeds a second temperature gradient standard value d2 of the heater 201, the engine controller 304 detects that abnormal threshold rise of the heater 201 occurs.

The engine controller 304 turns off the relay 303 at the timing t53, so that the engine controller 304 prevents sticking between the film 203 and the pressing roller 208 by lowering the temperature in the image heating device 200.

The engine controller 304 turns on the relay 303 at the timing t54 after a lapse of the first time T1 from the timing t53. At this time, in part (b) of FIG. 10, the triac 308 of the control substrate 300 causes the short-circuit failure, and therefore, the control flows through the heater 201, so that the detection temperature of the triac 308 rises.

The engine controller 304 causes the thermistor 202 to detect a fifth temperature a5 at the timing t54 and then to detect a sixth temperature a6 at the timing t55 after a lapse of a third time T3 from the timing t54. The engine controller 304 calculates a first temperature gradient from the fifth temperature a5, the sixth temperature a6, and the third time T3. The engine controller 304 is capable of detecting that the calculated first temperature gradient is a first temperature gradient standard value d1 or more. In the case where the first temperature gradient in the third time T3 is the first temperature gradient standard value d1 or more, the image forming apparatus 100 is capable of discriminating from the above-described control that the cause of the occurrence of the abnormal temperature rise of the heater 201 is due to the short-circuit failure of the triac 308 of the control substrate 300.

(Flowchart of Discrimination of Cause of Temperature Rise)

FIG. 11 shows a flowchart of discrimination processing in the embodiment 2. Incidentally, processing of S1501 to S1503 is similar to the processing of S1201 to S1203 and therefore will be omitted from description.

In S1504, the engine controller 304 holds a detection temperature by the thermistor 202 as the third temperature a3. After a lapse of the second time T2 is S1505, the engine controller 304 holds a detection temperature by the thermistor 202 as the fourth temperature a4 in S1506. In S1507, the engine controller 304 calculates the second temperature gradient from the third temperature a3, the fourth temperature a4, and the second time T2. The engine controller 304 discriminates whether or not the calculated second temperature gradient exceeds the second temperature gradient standard value d2.

In the case where the engine controller 304 discriminated in S1507 that the second temperature gradient does not exceed the second temperature gradient standard value d2, the engine controller 304 causes the processing to go to S1508. Incidentally, the processing of S1508 is similar to the processing of S1206 of FIG. 9 and will be omitted from description. In the case where the engine controller 304 discriminated in S1507 that the second temperature gradient exceeds the second temperature gradient standard value d2, the engine controller 304 discriminates that the abnormal temperature rise of the heater 201 occurs, and then it causes the processing to go to S1509.

In S1509, the engine controller 304 turns off the relay 303. In S1510, the engine controller 304 lowers the temperature in the image heating device 200 and then waits a lapse of the first time T1 in order to prevent the sticking between the film 203 and the pressing roller 208. In S1511, the engine controller 304 holds the detection temperature by the thermistor 202 as the fifth temperature a5. In a stage of S1511, the cause of the occurrence of the abnormal temperature rise of the heater 201 cannot be properly selected between due to the change in voltage waveform of the AC power source 117 and due to the short-circuit failure of the triac 308 of the control substrate 300. In order to properly select the cause, in S1512, the engine controller 304 turns on the relay 303. After a lapse of the third time T3 is S1513, the engine controller 304 holds the detection temperature by the thermistor 202 as the sixth temperature a6 in S1514.

In S1515, the engine controller 304 calculates the first temperature gradient from the fifth temperature a5, the sixth temperature a6, and the third time T3. The engine controller 304 discriminates whether or not the calculated first temperature gradient exceeds the first temperature gradient standard value d1. In the case where the engine controller 304 discriminated in S1515 that the first temperature gradient exceeds the first temperature gradient standard value d1, the engine controller 304 causes the processing to go to S1516. In the case where the engine controller 304 discriminated in S1515 that the first temperature gradient does not exceed the first temperature gradient standard value d1, the engine controller 304 causes the processing to go to S1518. Incidentally, the processing of S1516 to S1518 is similar to the processing of S1212 to S1214 of FIG. 9, and therefore, will be omitted from description.

When the above-described control is carried out, it is possible to discriminate whether the cause of occurrence of the abnormal temperature rise of the heater 201 is due to the change in AC power source 117 from the sine wave to the square wave or due to the short-circuit failure of the triac 308 of the control substrate 300. In the embodiment 2, the first temperature gradient standard value d1 and the second temperature gradient standard value d2 are different values, but they may also be the same value.

As described above, according to the embodiment 2, when the heating member became the abnormally high temperature, the cause thereof can be discriminated.

(Selective Use of Method of Discriminating Abnormal Temperature Rise)

Whether a method of detecting the abnormal temperature rise of the heater 201 is the abnormal temperature threshold described in the embodiment 1 or the abnormal temperature gradient described in the embodiment 2 can be selected depending on, for example, that the film 203 and the pressing roller 208 are rotated or rotation thereof is stopped. FIG. 12 is a graph showing a relationship between an elapsed time from a start of the temperature control and the detection time of the thermistor 202, in which a state that rotation of the film 203 and the pressing roller 208 is indicated by a broken line and a state that a stop of the rotation is indicated by a solid line. Further, t61, t62, T5, T4, and T6 show respective timings. The timing t61 is a timing when the temperature control is started, and the timing t62 is a timing when the temperature control is ended.

When the abnormal temperature rise of the heater 201 occurs in a state in which the film 203 and the pressing roller 208 are at rest, as indicated by the solid line in the graph of FIG. 12, the temperature of the thermistor 202 increases in a short time. In the case where the occurrence of the abnormal temperature rise is detected at the abnormal temperature threshold, the relay 303 is interrupted in T4 which is a timing when a seventh temperature a7 is the abnormal temperature threshold c2 or more.

On the other hand, in the case where the abnormal temperature rise is detected at the second temperature gradient standard value d2, in order to grasp that the temperature of the heater 201 raises within a time continuous to some extent, an abnormality detecting temperature is a eighth temperature a8 which is low, and a timing when the relay 303 is interrupted is T5. In this case, by the control of the embodiment 2, the abnormal temperature rise of the heater 201 can be detected in a time shorter (in a timing earlier) than T4, so that the sticking between the film 203 and the pressing roller 208 can be prevented.

On the other hand, when the abnormal temperature rise occurs in the heater 201 in the state in which the film 203 and the pressing roller 208 are rotated, as indicated by the broken line of FIG. 12, the temperature of the thermistor 202 rises in a long time. In this case, when the abnormal temperature rise is intended to be detected by the temperature gradient, the temperature rise such that a set temperature gradient standard value is satisfied is not obtained. For this reason, in such a case, the engine controller 304 cannot detect the abnormal temperature rise of the heater 201.

For this reason, in the case where the film 203 and the pressing roller 208 are at rest, when the detection using the abnormal temperature threshold described in the embodiment 1 is made, the relay 303 is interrupted at T6 which is a timing when the seventh temperature a7 of the thermistor 202 exceeds the abnormal temperature threshold c1. In this case, a time until the relay 303 is interrupted becomes long, but the film 203 and the pressing roller 208 are rotated, and therefore, the sticking does not occur.

Thus, in the case where the film 203 and the pressing roller 208 which are rotatable members are at rest, the method of the embodiment 2 may be used, and in the case where the film 203 and the pressing roller 208 are rotated, the method of the embodiment 1 may be used. As described above, the method of detecting the abnormal temperature rise of the heater 201 may be selectively and properly used depending on an operation state such as a stop state, a rotation state, or the like of the rotatable members included in the image heating device 200 (fixing device).

OTHER EMBODIMENTS

The present invention is capable of being realized even in processing in which a program for realizing one or more functions in the above-described embodiments is supplied to a system or an apparatus via a network or a storing medium and in which one or more processors in a computer of the system or the apparatus read and execute the program. Further, the present invention is capable of being realized by a circuit (for example, ASIC) for realizing one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-202275 filed on Nov. 29, 2023, which is hereby incorporated by reference herein in its entirety.

What is claimed is:

1. An image forming apparatus for forming a toner image on a recording material, comprising:

- a fixing unit configured to fix the toner image, formed on the recording material, on the recording material, the fixing unit including a heater configured to heat the toner image and a temperature detecting element configured to detect a temperature of the heater;
- a switching element connected in a power supply path from an AC power source to the heater, the switching element being switched depending on a heater driving signal to a conduction state in which electric power from the AC power source is supplied to the heater or to a non-conduction state in which the electric power is not supplied to the heater;
- an interrupting element connected in the power supply path and being put in a connection state in which the heater and the AC power source are connected to each other or an interruption state in which connection between the heater and the AC power source is interrupted; and a controller configured to control the switching element and the interrupting element on the basis of temperature information detected by the temperature detecting element, wherein in a case where the heater is raised in temperature when the interrupting element is in the connection state and the heater driving signal to the switching element is turned off, the controller switches the interrupting element from the connection state to the interruption state while keeping the heater driving signal off and switches the interrupting element from the interruption state to the connection state after a lapse of a predetermined time while keeping the heater driving signal off.

2. An image forming apparatus according to claim 1, wherein the controller discriminates a cause of temperature rise of the heater depending on the temperature of the heater after the interrupting element is switched from the interruption state to the connection state while keeping the heater driving signal off.

3. An image forming apparatus according to claim 2, wherein in a case where the heater is not raised in temperature after the interrupting element is switched from the interruption state to the connection state while keeping the heater driving signal off, the controller discriminates that a waveform of an AC voltage applied to the heater is abnormal.

4. An image forming apparatus according to claim 2, wherein in a case where the heater is raised in temperature after the interrupting element is switched from the interruption state to the connection state while keeping the heater driving signal off, the controller discriminates that the switching element is abnormal.

5. An image forming apparatus according to claim 2, wherein the fixing unit includes a rotatable member contacting the recording material and for conveying the recording material, and wherein the controller discriminates the cause of the temperature rise of the heater in a state in which the rotatable member is rotated.

6. An image forming apparatus according to claim 1, wherein in a case where the heater is raised in temperature after the interrupting element is switched from the interruption state to the connection state while keeping the heater driving signal off, the controller switches the interrupting element from the connection state to the interruption state again.

7. An image forming apparatus according to claim 1, wherein the controller discriminates a cause of temperature rise of the heater depending on a temperature gradient of the heater after the interrupting element is switched from the interruption state to the connection state while keeping the heater driving signal off.

8. An image forming apparatus according to claim 7, wherein the fixing unit includes a rotatable member contacting the recording material and for conveying the recording material, and wherein the controller discriminates the cause of the temperature rise of the heater in a state in which rotation of the rotatable member is stopped.

9. An image forming apparatus according to claim 1, wherein the switching element is a bidirectional thyristor, and the interrupting element is a relay.

10. An image forming apparatus according to claim 1, wherein the fixing unit includes a cylindrical film contacting the recording material and a pressing roller contacting an outer peripheral surface of the film, wherein the heater is provided in an internal space of the film, and wherein the heater and the pressing roller form a nip, via the film, in which the recording material is nipped and conveyed.

* * * * *